US012419437B2

(12) United States Patent
Bengtsson

(10) Patent No.: US 12,419,437 B2
(45) Date of Patent: Sep. 23, 2025

(54) UPHOLSTERY MEMBER

(71) Applicant: Inter IKEA Systems B.V., LN Delft (NL)

(72) Inventor: Jens Bengtsson, Almhult (SE)

(73) Assignee: Inter IKEA Systems B.V., LN Delft (NL)

( * ) Notice: Subject to any disclaimer, the term of this patent is extended or adjusted under 35 U.S.C. 154(b) by 407 days.

(21) Appl. No.: 17/784,204

(22) PCT Filed: Dec. 10, 2020

(86) PCT No.: PCT/SE2020/051189
§ 371 (c)(1),
(2) Date: Jun. 10, 2022

(87) PCT Pub. No.: WO2021/118443
PCT Pub. Date: Jun. 17, 2021

(65) Prior Publication Data

US 2023/0041113 A1 Feb. 9, 2023

(30) Foreign Application Priority Data

Dec. 13, 2019 (SE) .................................... 1951456-1

(51) Int. Cl.
*A47C 31/02* (2006.01)
*A47C 19/02* (2006.01)
(Continued)

(52) U.S. Cl.
CPC .......... *A47C 31/026* (2013.01); *A47C 19/022* (2013.01); *B68G 7/02* (2013.01); *B68G 13/00* (2013.01)

(58) Field of Classification Search
CPC ..... A47C 31/026; A47C 31/02; A37C 19/022; B68G 7/02; B68G 7/08; B68G 13/00; A44B 1/12
(Continued)

(56) References Cited

U.S. PATENT DOCUMENTS 2,458,588 A 1/1949 Gordon et al.
2,802,297 A * 8/1957 Meyer ...................... B68G 7/08 24/711.4
(Continued)

FOREIGN PATENT DOCUMENTS

GB 1121230 7/1968
GB 1260254 1/1972
(Continued)

OTHER PUBLICATIONS

Extended European Search Report dated Dec. 7, 2023 in the corresponding European application 20899080.4 (7 pages).
(Continued)

*Primary Examiner* — Justin C Mikowski
*Assistant Examiner* — Alison N Labarge
(74) *Attorney, Agent, or Firm* — Merchant & Gould P.C.

(57) ABSTRACT

An upholstery member includes a base board (101) having at least one base board opening (116), a fixation arrangement (140), and a resilient wadding (102). The wadding (102) is pressed at least to some extent through the base board opening (116) and connected to the fixation arrangement (140), thereby forming an indent (130) in the upholstery member (100). Further, the invention relates to a method for manufacturing the upholstery member comprising the steps of providing (310) a base board (101) having at least one base board opening (116) and being covered with a wadding (102) on a front side of said base board (101), passing (320) the wadding (102) through said base board opening (116),
(Continued)

whereby the indent (13) is formed, and securing (330) the position of the wadding (102) relative the base board (101).

25 Claims, 6 Drawing Sheets

(51) Int. Cl.
*B68G 7/02* (2006.01)
*B68G 13/00* (2006.01)

(58) Field of Classification Search
USPC ................................ 24/113 R, 114.3, 114.12
See application file for complete search history.

(56) References Cited

U.S. PATENT DOCUMENTS

| | | | | | |
|---|---|---|---|---|---|
| 2,910,116 | A | * | 10/1959 | Runge | A47C 31/026 5/655.6 |
| 2,977,653 | A | * | 4/1961 | Adinolfi | A44B 1/12 24/113 R |
| 3,449,802 | A | * | 6/1969 | Mackey | A44B 1/28 411/353 |
| 4,549,331 | A | * | 10/1985 | Coley | A44B 1/12 24/92 |
| 5,214,811 | A | | 6/1993 | Priem | |
| 2016/0045033 | A1 | * | 2/2016 | Gioe | A47C 19/022 5/280 |
| 2016/0345747 | A1 | | 12/2016 | Selle et al. | |

FOREIGN PATENT DOCUMENTS

| | | | | | |
|---|---|---|---|---|---|
| GB | 1411972 | | | 10/1975 | |
| GB | 2176997 | A | | 1/1987 | |
| JP | S50144804 | U | | 11/1975 | |
| JP | S50144805 | U | * | 11/1975 | A47C 17/00 |
| JP | S5241441 | Y2 | | 9/1977 | |
| JP | S5433522 | Y2 | | 10/1979 | |

OTHER PUBLICATIONS

PCT International Search Report for PCT Application No. PCT/SE2020/051189 mailed Jan. 19, 2021 (5 pages).

PCT Written Opinion for PCT Application No. PCT/SE2020/051189 mailed Jan. 19, 2021 (6 pages).

Swedish Search Report for SE Application No. 1951456-1 mailed May 26, 2020 (3 pages).

Swedish Office Action for SE Application No. 1951456-1 mailed May 26, 2020 (5 pages).

* cited by examiner

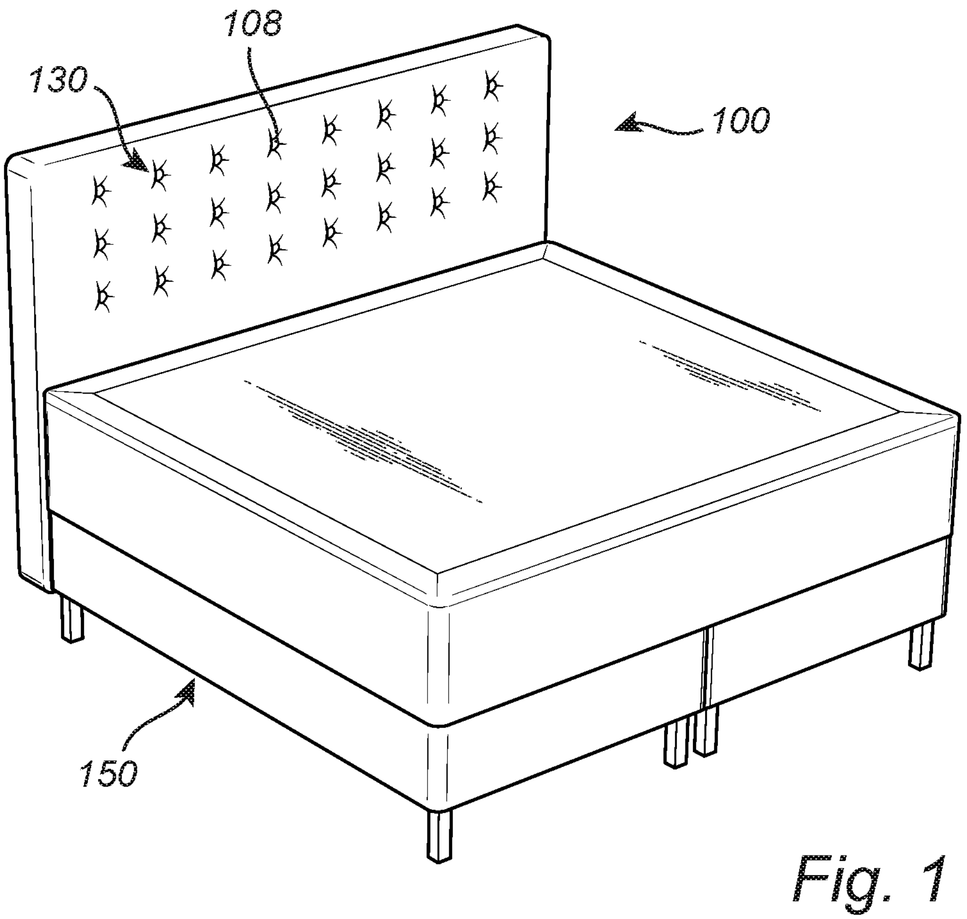
Fig. 1
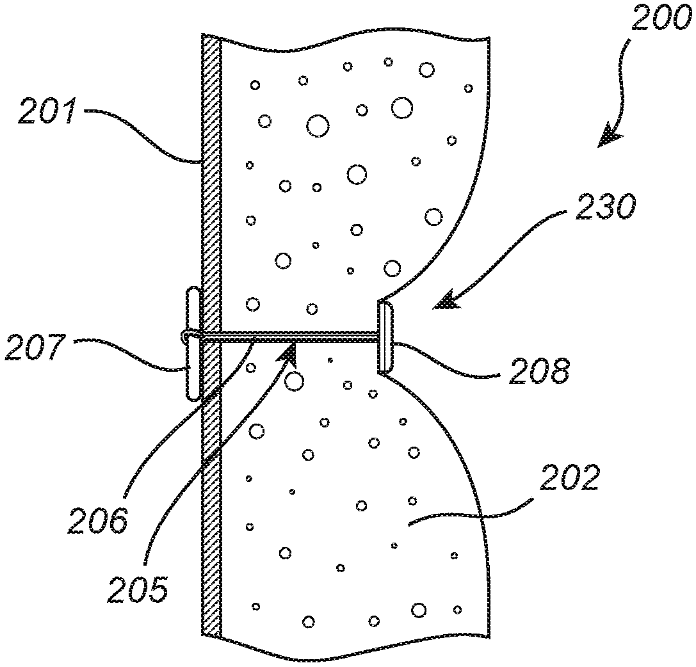
(Prior art) Fig. 2

UPHOLSTERY MEMBER

This application is a National Stage Application of PCT/SE2020/051189, filed 10 Dec. 2020, which claims benefit of Serial No. 1951456-1, filed 13 Dec. 2019 in Sweden, and which applications are hereby incorporated by reference in their entireties. To the extent appropriate, a claim of priority is made to each of the above disclosed applications.

FIELD OF THE INVENTION

The present invention relates to an upholstery furniture member. Further, the invention relates to a method for manufacturing said furniture member.

BACKGROUND

Upholstery furniture, such as headboards for bedframes, sofas, chairs and cushions, are popular among consumers since they provide comfort and an esthetical appearance. Especially, upholstery headboards are appealing since they provide an exclusive look to the bed. Buttons arranged in symmetrical patterns are used to keep upholstery in place on the headboard and to provide a certain style to the headboard.

In known upholstery headboards, each button is attached to a pin that penetrates the foam and creates an indent in the foam. Prior art concerning upholstery members comprising indents are for instance disclosed in the documents GB 2176997 A, GB 1411972 A, and GB 1260254 A.

However, upholstery headboards require a rather thick layer of foam. The foams used are typically low cast foams made from plastic based materials, which can be non-environmentally friendly and difficult to recycle.

Hence, there is a need for an upholstery headboard being more sustainable.

SUMMARY

The present invention seeks to mitigate, alleviate, eliminate or circumvent one or more of the above identified deficiencies in the art and disadvantages singly or in any combination by providing an upholstery member, which comprises a base board having at least one base board opening, a fixation arrangement, and a resilient wadding. The wadding is pressed at least to some extent through the base board opening and is connected to the fixation arrangement, thereby forming an indent in the upholstery member. This upholstery member is advantageous since the base board opening and fixation arrangement allows for the formation of indents with the use of less wadding while still providing the same appearance. Since wadding materials often consist of plastic based materials, less use of such material is preferably considering environmental aspects.

The fixation arrangement may comprise a fastener configured to engage the wadding from the exterior side of the upholstery member, and an associated attachment device configured to receive the fastener.

In one embodiment, the attachment device is tapered, e.g. in the form of a cup, and it comprises a cavity configured to receive the wadding.

The depth of the cavity is preferably greater than the thickness of the wadding.

The fastener is preferably longer than the thickness of the wadding.

In another embodiment, the attachment device is configured to fit in the base board opening such that the attachment device is arranged on a rear side of the base board. This is beneficial since the attachment device will not be seen from the exterior side of the upholstery member visible for the user.

In yet another embodiment, the attachment device comprises a circumferential flange having a diameter $D_F$ being substantially equal to a diameter $D_B$ of an inner circumference of the base board opening. This is advantageous since it provides that the attachment device fits snugly within the base board opening.

The attachment may further comprise an outer slit that allows for a deformation of said attachment device when compression force is applied thereto. This facilitates the fitting of the attachment device into the base board opening.

In one embodiment, the fastener comprises a pin and a connectable locking member. At least a part of the pin is configured to pass through the wadding, the base board opening and the attachment device whereby the locking member is configured to fixate the position of the pin relative the attachment device.

The attachment device may further comprise a centre opening configured to receive the pin.

In one embodiment, the attachment device further comprises at least one outer recess. The outer recess is advantageous since it enables the use of less plastic material for forming the attachment device.

The centre opening may be associated with the outer recess through a centre slit. Hence, the outer opening and the centre slit are advantageous in that the pin may be inserted into the outer recess and subsequently inserted into the smaller centre opening through the centre slit. Hence, the fixation of the fastener is facilitated.

In one embodiment, the pin further comprises a loop configured to receive the locking member. This simplifies the fastening of the pin.

In another embodiment, there is provided a cover sheet covering at least the exterior side of the wadding.

In yet another embodiment, the upholstery member is an upholstered furniture member, or a sound absorbing panel. Preferably, the upholstery furniture member is a headboard of a bed, a back seat, an arm rest, or a cushion seat of a sofa or chair.

In a further embodiment, the wadding has a thickness of preferably between 1 cm and 5 cm, more preferably between 1.5 cm and 4 cm, and most preferred about 2 cm. This thickness of the wadding is beneficial since less wadding material is used to form indent in the upholstery members. Hence, the upholstery member becomes more environmentally friendly and cheaper to produce.

In a second aspect, there is provided a method for manufacturing an upholstery member having at least one indent. The method comprises the steps of providing a base board having at least one base board opening and being covered with a wadding on a front side of said base board, passing the wadding through the base board opening, whereby the indent is formed, and securing the position of the wadding relative the base board. This method is advantageous since it is possible to form an upholstery member having indents with the use of a much thinner layer of wadding material.

In one embodiment, the method further comprises a step of arranging an attachment device on a rear side of the base board using a fixation arrangement before passing the wadding through the base board opening.

In another embodiment, the method comprises that, during the arranging step, the attachment device is fitted in the base board opening In yet another embodiment, the method comprises that, during the passing step, the fastener engages and forces at least parts of the wadding through the base board opening and the fastener is fixed on a rear side of the base board with the aid of the attachment device.

In one embodiment, the method comprises that, during the passing step a pin of the fastener is pushed through the wadding and through the base board opening. Preferably, the fastener is pushed also through a centre opening of the attachment device.

In another embodiment, there is provided a method wherein the pin is fixed on a rear side of the attachment device. Preferably, the pin is fixed by using a locking member.

Further advantageous features of the invention are elaborated in embodiments disclosed herein. In addition, advantageous features of the invention are defined in the dependent claims.

BRIEF DESCRIPTION OF THE DRAWINGS

These and other aspects, features and advantages of which the invention is capable of will be apparent and elucidated from the following description of embodiments of the present invention, reference being made to the accompanying drawings, in which:

FIG. 1 depicts a bed to which an upholstery headboard is attached;

FIG. 2 is a cross-section of a prior art upholstery headboard;

DETAILED EMBODIMENTS

Figure 3:
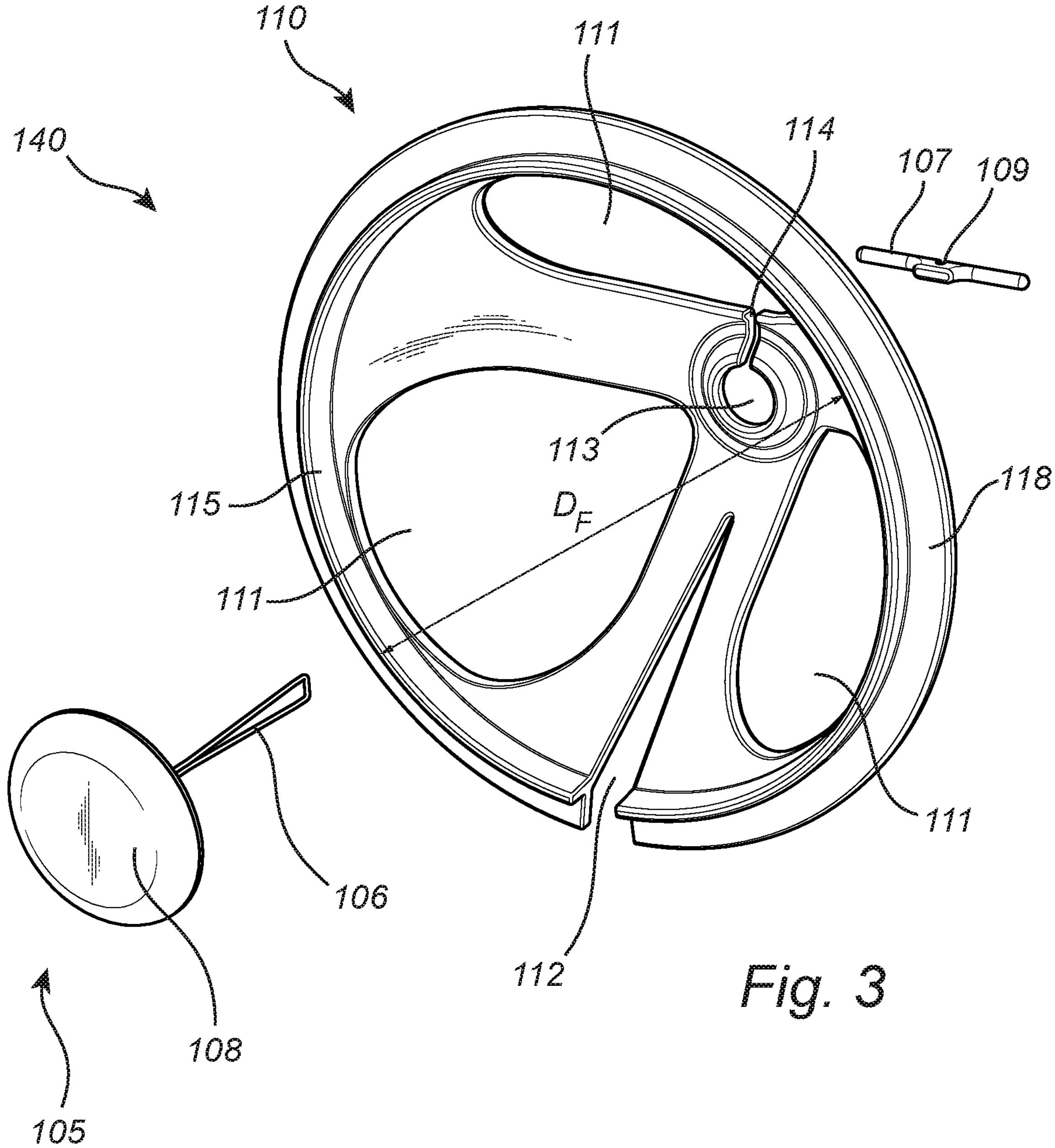
FIG. 3 is an isometric view of a fixation arrangement according to an embodiment.

Hereinafter, certain embodiments will be described more fully with reference to the accompanying drawings. The invention may, however, be embodied in many different forms and should not be construed as limited to the embodiments set forth herein. Rather, these embodiments are provided by way of example so that this disclosure will be thorough and complete, and will fully convey the scope of the invention, such as it is defined in the appended claims, to those skilled in the art.

With reference to FIG. 1, an upholstery headboard 100 is shown being attached to a bed 150. The headboard 100 has a plurality of indents 130 each being covered and provided with a head or button 108. It should be noted that the head or button 108 may be replaced by other means for assisting in the formation of the indents 130. Such means may e.g. comprise a string, as will be explained further below.

A cross-sectional view of a prior art upholstered headboard 200 is shown in FIG. 2. The headboard 200 comprises a rigid base board 201 and a wadding 202 in the form of a soft foam material. A fastener 205 comprising a pin 206, a releasable locking member 207, and a head 208 is used to form an indent 230 in the wadding 202. The pin 206, to which the head 208 is attached, penetrates the wadding 202 and the panel 201, and the locking member 207 is connected to the pin 206 and used to fix the pin 206 on the back side of the panel 201. As shown in FIG. 2, a thick layer of the wadding 202 is necessary to enable the formation of an indent 230. This leads to excessive use of wadding material. The thickness of the wadding 202 is usually about 10 cm.

With reference to FIG. 3, an attachment device 110, also referred to herein as a cup 110, and a fastener 105 is shown. The cup 110 and the fastener 105 together constitute a fixation arrangement 140. The cup 110 has three larger recesses 111, a centre opening 113, an outer slit 112 and a centre slit 114. The cup 110 also has a circumferential flange 115 having a diameter $D_F$ and a circumferential rim 118. The larger recesses 111 are also referred to as the outer recesses 111 herein.

The attachment device 110 may have a substantially conical shape, independently of other features such as recesses 111 and slits 112, 114. The attachment device 110 is in such embodiments preferably tapered from a large diameter end towards a small diameter end. The attachment device 110 is thus configured as having two opposing ends, whereby one end is smaller than the other end.

Preferably, the cross-section of the attachment device 110 is circular, whereby one end of the attachment device 110 has a larger diameter than the opposite end.

The fastener 105 has a button or head 108, a pin 106 and a releasable locking member 107. A part of the pin 106 is configured to be inserted into the centre opening 113, or alternatively, inserted into the large recess 111 associated with the centre opening 113 through the centre slit 114, and moved through the centre slit 114 into the centre opening 113. The recesses 111 also enable less use of the material of which the cup 110 is formed. A more detailed description of how the fixation arrangement 140 is assembled will be described more in the following. It should be noted that the fastener 105 does not necessarily need to be provided with the button or head 108, as long as it has some means for not being pulled through the wadding as will be described later.

In another embodiment not shown herein, the attachment device 110 is snap fitted into the base board opening 116. In such case, the cup 110 for instance has, in addition to the circumferential flange 115 the circumferential rim 118, at least one lateral snap fit projection extending from the rim 118 in parallel with the flange 115. The flange 115, the rim 118 and the lateral projection together forms a U-shaped socket in which the inner circumference of the base board opening 116 fits. Thus, when the attachment device 110 of this embodiment is fitted into the base board opening 116, the flange 115 and the lateral snap fit projection will hold the attachment device 110 in place. Hence, the attachment device 110 cannot be pushed out of the base board 101 during the formation of the indents. The attachment device 110 may comprise other features enabling a snap fit attachment of the device 110 to the base board 101.

Figure 4:
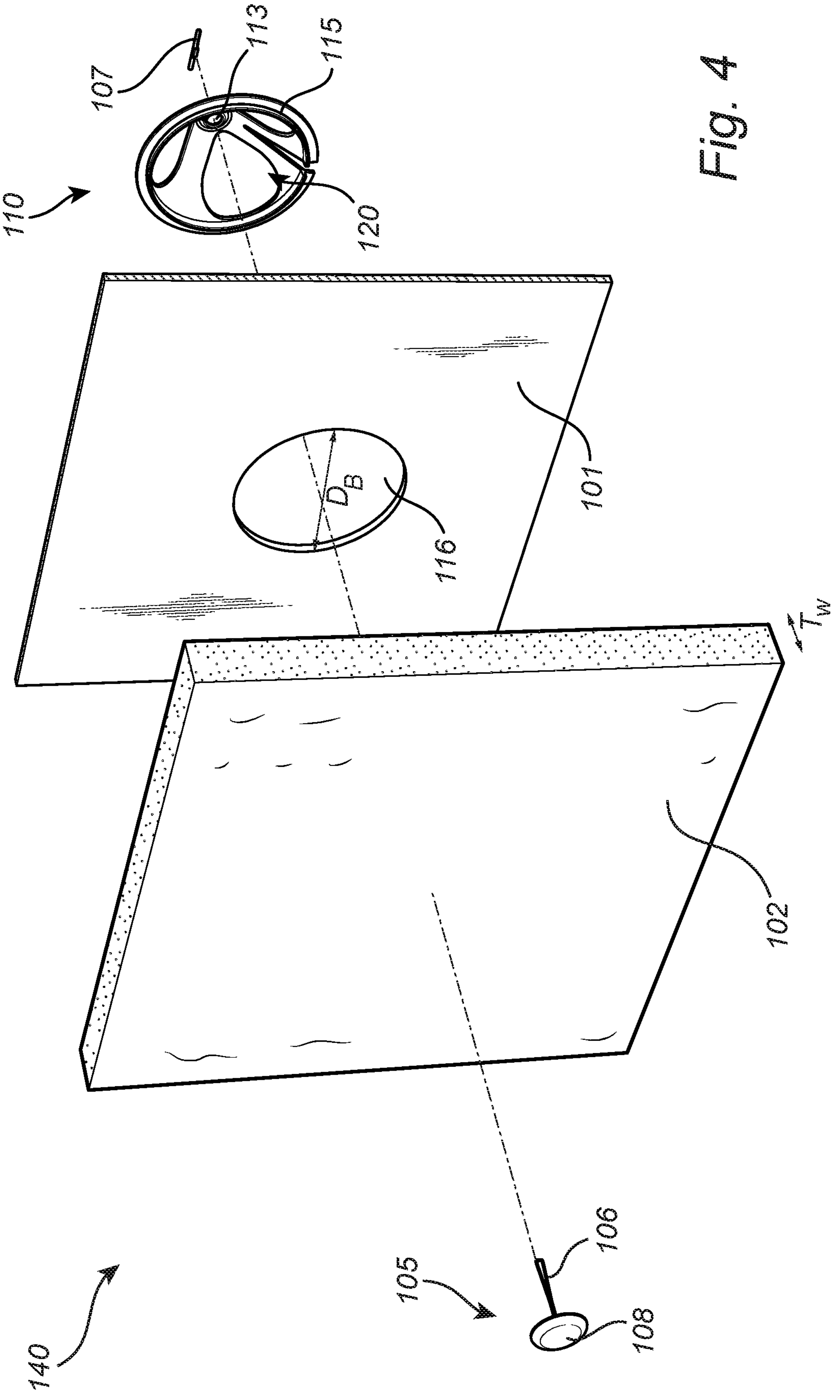
FIG. 4 is an exploded view of components of an upholstery member.
Figure 5A:
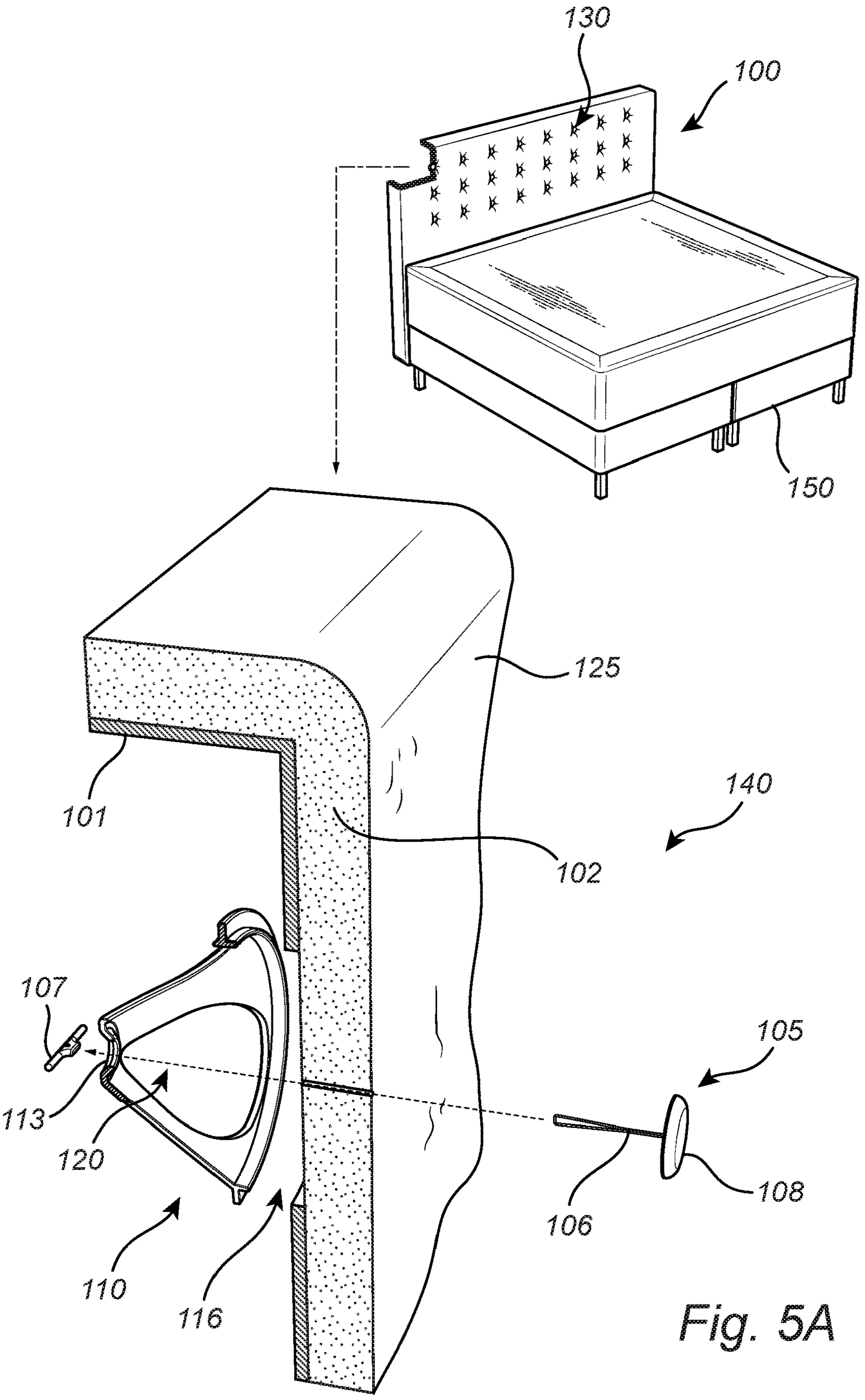
FIG. 5A is a cross-sectional view of a part of an upholstery headboard.

FIG. 4 shows an exploded view of the fixation arrangement 140, and how the attachment device 110 and the fastener 105 should be assembled to create an indent 130 (not shown) in an upholstery member 100, such as a headboard 100 (see FIG. 5A). The attachment device 110 is arranged on a rear side of the base board 101 through the opening 116 of the base board 101 such that the end of the attachment device 110 having a larger diameter is aligned with the opening 116 of the base board 101. A part of a wadding 102 is arranged in front of the base board 101. The base board opening 116 has a diameter $D_B$ in the same range as the diameter $D_F$ of the flange 115 of the cup 110. The flange 115 is configured to fit with the base board opening

116 such that the outer periphery of the flange 115 will rest against the rear side of the base board 101, immediately radially outwards the base board opening 116.

The base board 101 is preferably made of a wood board, such as plywood, a medium density fibre (MDF) board, a high density fibre (HDF) board or any other sustainable material of similar rigidity as an HDF board. A thickness of the base board 101 is preferably in the range of 1 mm to 10 mm, more preferable in the range of 1.5 mm to 7 mm, most preferred between 2 mm and 5 mm. The diameter $D_B$ of the base board openings 116 are preferably in the range of 40 mm to 200 mm, more preferably in the range of 50 mm to 150 mm, and most preferred between 60 mm and 100 mm.

The wadding 102 is in the form of a resilient, soft material such as a foam material and may be made of for instance of polyester fibres. A thickness $T_W$ of the wadding 102 is typically in the range of 1 cm to 5 cm, such as in the range of 1.5 cm to 4 cm, preferably about 2 cm. A surface density of the wadding 102 may be in the range of 20 to 500 g/m$^2$, more preferable between 50 and 450 g/m$^2$ and most preferred between 100 and 400 g/m$^2$.

Figure 5B:
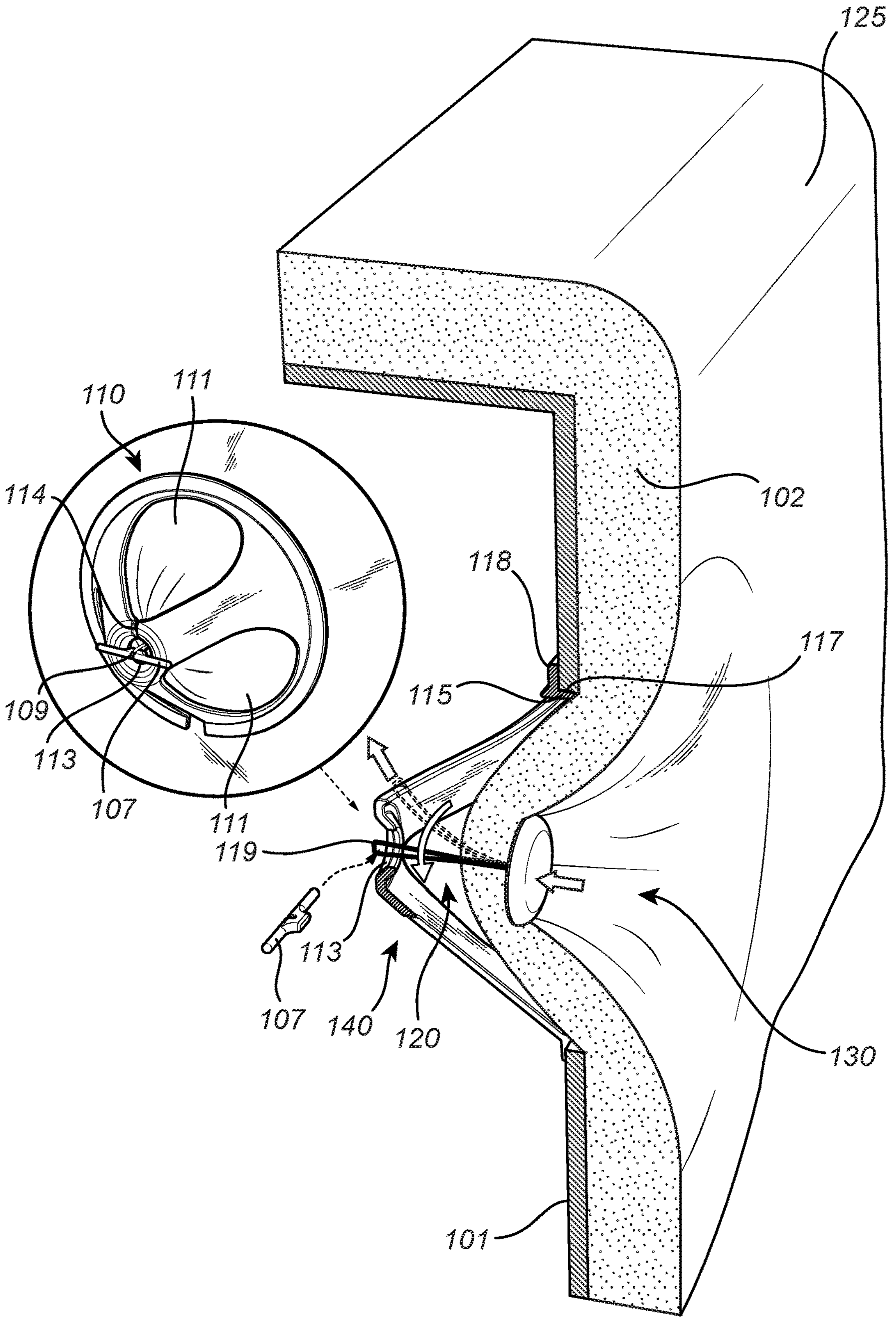
FIG. 5B is a cross-sectional view of the part of the upholstery headboard shown in FIG. 5A during formation of an indent.

The attachment device 110 is preferably made of a flexible material, such as a plastic. The plastic may be for instance polystyrene. The outer slit 112 allows for the cup 110 to be compressed such that the diameter $D_F$ of said flange 115 is decreased. Upon release of the applied pressure, the cup 110, and thus the flange 115, will expand back to its original shape and diameter $D_F$. A depth (i.e. the distance between the two opposing ends) of the attachment device 110 is large enough such that the wadding 102 need not fill the entire cavity 120 of the attachment device 110 when an indent 130 is formed (as shown in FIG. 5B). Hence, the depth of the attachment device 110 is preferably greater than the thickness of the wadding 102.

The flange 115 is provided with an axially protruding circumferential rim 118, extending away from the flange 115. By compressing the diameter of the cup, also the flange 115 will be compressed. While being deformed, the flange 115 can be inserted into the base board opening 116 from the rear side, until the rim 118 abuts the rear side of the base board 101. A laterally facing edge 117 (shown in FIG. 5B) of the flange 115 abuts an inner circumference of the base board opening 116. When releasing the compression force from the cup 110, the flange 115 will return to its original diameter, thereby providing a radial force against the periphery of the base board opening 116. Hence, the cup 110 will be fixated inside the base board opening 116.

To form an indent 130 (not shown), a part of the pin 106 of the fastener 105 is inserted into and through the wadding 102. Further, the pin 106 is inserted through the base board opening 116 and through the centre opening 113 of the cup 110. The resilient wadding 102 will be forced into the cavity 120 of the cup 110, and the locking member 107 is connected to the pin 106 from the rear side of the base board 101. As the wadding 102 is urged to return to its original planar form, the wadding will actually apply a pulling force to the pin 106, which thereby pulls the locking member 107 towards the rear side of the cup 110, which in turn is pulled against the rear side of the base board 101. Consequently, an indent 130 is formed (see FIG. 1).

A length L of the pin 106 is of a dimension such that the wadding 102 has to be compressed if the pin 106 is to extend through the thickness of the wadding 102 and the base board 101. Hence, a length L of the pin 106 is smaller than the combination or sum of the thickness of the wadding 102, the base board 101 and the thickness (or depth) of the cup 110 at the centre opening 113 (i.e. its total depth). In a preferred embodiment, the length L of the pin 106 is smaller than the depth of the attachment device 110. The length L of the pin 106 is preferably greater than the thickness of the wadding 102, such that there will be a space between the inner side of the wadding 102 and the small-diameter end of the attachment device 110, as indicated in FIG. 5B. However, the length L of the pin 106 may be substantially longer, such as larger than the combined thickness of the base board 101 the thickness of the cup 110 at the centre opening 113 (i.e. its depth). When the pin 106 is pulled through the centre opening 113 and securely fastened to the back side of the cup 110, the head button 108 will force wadding 102 closer to the base board 101.

The formation of an indent 130 is shown in FIGS. 5A and 5B. In FIG. 5A, a cross-section of a part of the headboard 100 is shown. The base board 101 serves as a rigid support for the wadding 102, which is arranged on a front side of the base board 101. The tapered cup 110 is placed on a rear side of the base board 101 at a position being aligned with the base board opening 116. The exterior surface of the wadding 102 is preferably covered with a cover sheet 125, which may be for instance a fabric or leather. As indicated by the arrow in FIG. 5A, the pin 106 of the fastener 105 is configured to penetrate the wadding 102, the base board opening 116 and the centre opening 113 of the cup 110.

In FIG. 5B, the pin 106 has been inserted through the wadding 102 and the cup 110 has been fitted into the base board opening 116. More specifically, the flange 115 of the cup 110 engages the base board opening 116. The laterally facing edge 117 is in direct contact with the inner circumference of the base board opening 116. The circumferential rim 118 abuts the rear side of the base board 101, and prevents the cup 110 from being extracted through the base board opening 116.

The tapered cup 110 contributes to a smoother compression of the wadding 102, and thus decreases the risk of tearing or damaging the wadding 102. If a tear in the wadding 102 during formation of the headboard 100 occurs, the wadding 102 have to be exchanged and the formation process have to be repeated. This is both time consuming and not cost effective. However, the tapered cup 110 prevents this issue. Moreover, the tapered cup 110 makes the formation of the indents 130 easier, which renders the formation of indents 130 effective.

As shown in FIG. 5B, the pin 106 has been inserted through the centre opening 113 and the locking member 107 is about to be attached to the pin 106 (indicated with the dashed arrow between the locking member 107 and the end of the pin 106). Thus, the fastener 105 has pulled the cover sheet 125 and wadding 102 towards the base board opening 116, such that a portion of the wadding 102 in front of the opening 116 is forced through the base board opening 116 and into the cavity 120.

As shown in FIG. 5B, the wadding 102 only partly fills the cavity 120. Hence, there is a space between the centre opening 113 and the wadding 102 in the cavity 120. This is due to that the depth of the cup 110 is large enough such that the wadding 102 is not compressed entirely into a rear end of the cup 110. The depth of the cup 110 is deep enough such that an indent 130 can be formed without the need to fill the entire cavity 120 with the wadding 102. This, in addition to the tapered shape of the cup 110, mitigates the risk of tearing the wadding 102 during formation of indents 130. Since the wadding 102 does not need to be compressed to completely fill the cavity 120, the compression is smooth and thus the compression force exerted on the wadding material 102 will not damage the wadding 102.

An enlarged part of a rear view of the assembled fixation arrangement 140 is shown in FIG. 5B. The locking member 107 has a pin recess 109, which is engaged with the pin 106 after the locking member 107 has been inserted into a loop 119 of the pin 106.

A dashed version of the pin 106 in FIG. 5B indicates that the pin 106 may be pushed through the large recess 111 associated with the centre opening 113, and then moved through the centre slit 114 into the centre opening 113.

Once the pin 106 has been inserted through the centre opening 113, the locking member 107 is inserted into the loop 119, whereby the recess 109 may receive the pin 106. When the pin 106 is pulled through the wadding 102 and fixed behind the cup 110 using the locking member 107, the base board 101 and the cup 110, the resilient wadding 102 is brought passed the base board opening 116 and into the cavity 120 of the cup 110. Hence, an indent 130 is formed.

As seen in FIGS. 1 and 5A, the headboard 100 comprises a plurality (in the shown example 24) of indents 130. However, the headboard 100 or another upholstery furniture part may comprise any number of indents 130. For instance, a headboard 100 may comprise 32 indents 130 formed by indent arrangements 140 of the present disclosure.

Figure 6:
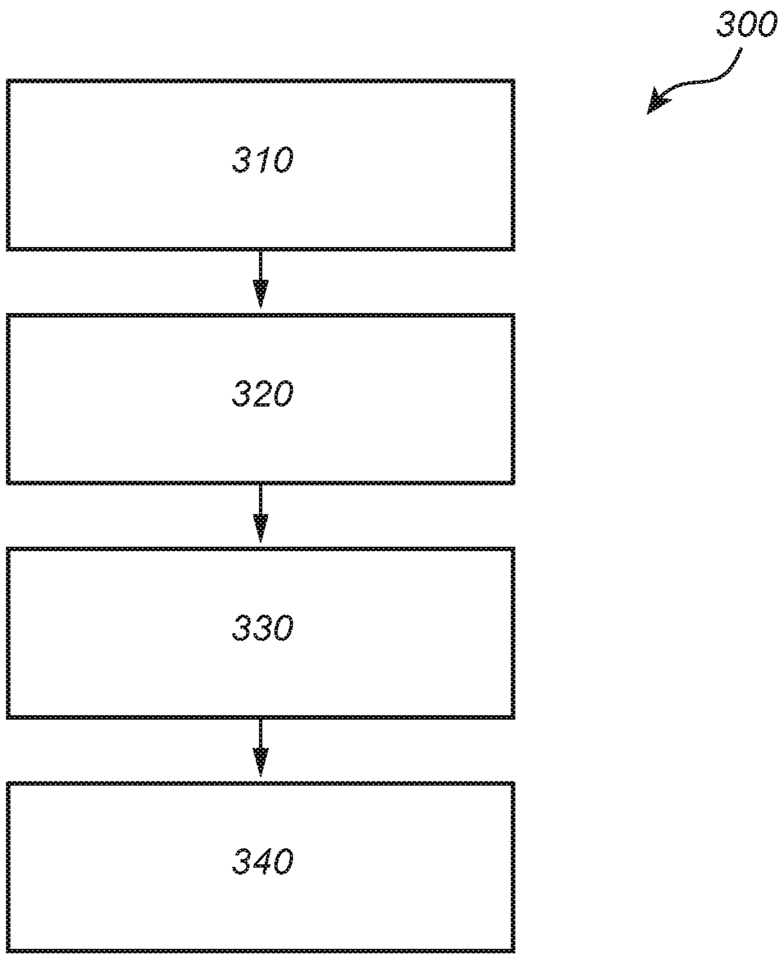
FIG. 6 shows a flow chart for a method for manufacturing an upholstery member according to the present disclosure.

With reference to FIG. 6, a flow chart for a method 300 for forming an upholstery member 100 having at least one indent 130 is shown. The upholstery member 100 may be an upholstery furniture part or a sound absorbing wall or panel. The upholstery furniture part may for instance be a headboard 100 of a bed frame, or a part of a sofa or chair.

The method 300 comprises a first step 310 of providing a base board 101 having at least one base board opening 116, and a wadding 102 arranged on a front side of the base board 101.

A second step 320 comprises passing the wadding 102 through the base board opening 116 using the fastener 105. The fastener 105 engages and forces at least parts of the wadding 102 through the base board opening 116 and the fastener 105 is fixed on a rear side of the base board 101 with the aid of the attachment device 110. The pin 106 may be fixed on a rear side of the attachment device 110, preferably by using a locking member 107.

Preferably, the pin 106 of the fastener 105 is pushed through the wadding 102 at a level aligned with the centre opening 113 of the cup 110. The pin 106 of the fastener 105 is pushed through the wadding 102 and through the base board opening 116, and preferably also through a centre opening 113 of the attachment device 110.

During the second step 320, the resilient wadding 102 is compressed and guided into the cavity 120 of the cup 110. The button 108 will aid the guidance of the wadding 102 into the cavity 120 and give an aesthetic character to the formed indent 130.

Alternatively, the pin 106 is passed through the large recess 111 associated with the centre opening 113 through the centre slit 114. In such case, the pin 106 is passed through the recess 111, and threaded through the centre slit 114 to enter the centre opening 113.

A third step 330 comprises securing 330 the position of the wadding 102 relative the base board 101. The wadding 102 is fixed on the rear side of the base board 101. The pin 106 which has been pulled through the base board opening 116 and the centre opening 113 is fixed to the rear side of the cup 110 using the locking member 107. The locking member 107 is inserted into the loop 119 of the pin 106 and the pin recess 109 receives the end of the pin 106 of the loop 119 (as shown in the enlarged portion of FIG. 5B).

A fourth step 340 comprises arranging 340 an attachment device 110 on a rear side of the base board 101 using a fixation arrangement 140 before passing 320 the wadding through the base board opening 116. During the arranging step 340, the attachment device 110 is fitted in the base board opening 116. Preferably, a compression force is applied to the cup 110 such that the diameter $D_F$ of the flange 115 is decreased, the cup 110 is compressed and inserted into the base board opening 116. When the cup 110 has been arranged in the base board opening 116, pressure is released whereby the flange 115 and the cup 110 springs back to its original diameter $D_F$ such that a laterally facing edge 117 of the flange 115 abuts against the inner circumference of the base board opening 116. Optionally, the cup 110 is fixed to the base board 101 using an adhesive, such as glue, or by clamping.

The upholstery member 100 disclosed herein may comprise any number of indents 130 arranged in any pattern. The base board opening 116 and the cup 110 need not necessarily be circular, they may have any shape allowing for the formation of an indent 130, such as an oblong or rectangular shape.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc. do not preclude a plurality.

The invention claimed is:

1. An upholstery member, comprising a base board having at least one base board opening, a fixation arrangement, and a resilient wadding wherein said wadding is pressed at least to some extent through the base board opening and connected to the fixation arrangement, thereby forming an indent in the upholstery member, wherein said fixation arrangement comprises a fastener configured to engage the wadding from an exterior side of the upholstery member, and an associated attachment device configured to receive said fastener, wherein the attachment device is an integral structure, and wherein said fastener is fixed to a rear side of the attachment device.

2. The upholstery member according to claim 1, wherein the attachment device is tapered comprising a cavity configured to receive the wadding.

3. The upholstery member according to claim 2, wherein the depth of the cavity is greater than the thickness of the wadding.

4. The upholstery member according to claim 1, wherein the fastener is longer than the thickness of the wadding.

5. The upholstery member according to claim 1, wherein said attachment device is configured to fit in said base board opening such that the attachment device is arranged on a rear side of the base board.

6. The upholstery member according to claim 1, wherein said attachment device comprises a circumferential flange having a diameter $D_F$ being substantially equal to a diameter $D_B$ of an inner circumference of said base board opening.

7. The upholstery member according to claim 1, wherein said attachment device further comprises an outer slit that allows for a deformation of said attachment device when compression force is applied thereto.

8. The upholstery member according to claim 1, wherein the fastener comprises a pin and a connectable locking member, at least part of the pin being configured pass through the wadding, the base board opening and the attachment device whereby the locking member is configured to fixate the position of said pin relative the attachment device.

9. The upholstery member according to claim 8, wherein said attachment device comprises a centre opening configured to receive said pin.

10. The upholstery member according to claim 9, wherein said attachment device further comprises at least one outer recess.

11. The upholstery member according to claim 10, wherein said centre opening is associated with the outer recess through a centre slit.

12. The upholstery member according to claim 9, wherein said pin further comprises a loop configured to receive the locking member.

13. The upholstery member according to claim 1, further comprising a cover sheet covering at least the exterior side of said wadding.

14. The upholstery member according to claim 1, wherein the upholstery member is an upholstered furniture member.

15. The upholstery member according to claim 14, wherein the upholstered furniture member is a headboard of a bed, a back seat, an arm rest, or a cushion seat of a sofa or chair.

16. The upholstery member according to claim 1, wherein the wadding has a thickness of preferably between 1 cm and 5 cm, more preferably between 1.5 cm and 4 cm, and most preferred about 2 cm.

17. The upholstery member according to claim 1, wherein the upholstery member is sound absorbing member.

18. A method for manufacturing an upholstery member having at least one indent, wherein the method comprises the steps of:

providing a base board having at least one base board opening and being covered with a wadding on a front side of said base board;

providing a fixation arrangement comprising a fastener configured to engage the wadding from an exterior side of the upholstery member, and an associated attachment device configured to receive said fastener, wherein the attachment device is an integral structure;

passing the wadding through said base board opening, whereby the indent is formed, and securing the position of the wadding relative the base board by fixing the fastener to a rear side of the attachment device.

19. The method according to claim 18, further comprising a step of arranging an attachment device on a rear side of the base board using a fixation arrangement before passing the wadding through the base board opening.

20. The method according to claim 19, wherein during the arranging step, the attachment device is fitted in the base board opening.

21. The method according to claim 18, wherein during the passing step, the fastener engages and forces at least parts of the wadding through the base board opening.

22. The method according to claim 18, wherein during the passing step, a pin of the fastener is pushed through the wadding and through the base board opening.

23. The method according to claim 22, wherein the pin is fixed on a rear side of the attachment device.

24. The method according to claim 23, wherein the pin is fixed on the rear side of the attachment device by using a locking member.

25. The method according to claim 22, wherein during the passing step, the pin of the fastener is pushed through the wadding and through the base board opening and through a centre opening of the attachment device.

* * * * *